United States Patent
Xin et al.

(10) Patent No.: US 10,906,152 B2
(45) Date of Patent: Feb. 2, 2021

(54) INTEGRATED EQUIPMENT FOR PROCESSING FIBER OPTIC FERRULE

(71) Applicants: Tyco Electronics (Shanghai) Co. Ltd., Shanghai (CN); TE Connectivity Corporation, Berwyn, PA (US); Innogetic Technology Co., Ltd., Zhuhai (CN)

(72) Inventors: Liming Xin, Shanghai (CN); Lvhai Hu, Shanghai (CN); Yun Liu, Shanghai (CN); Dandan Zhang, Shanghai (CN); Roberto Francisco-Yi Lu, Berwyn, PA (US); Lei Zhou, Shanghai (CN); Kok Wai Wong, Zhuhai (CN)

(73) Assignees: Tyco Electronics (Shanghai) Co. Ltd., Shanghai (CN); TE Connectivity Corporation, Berwyn, PA (US); Innogetic Technology Co., Ltd, Zhuhai (CN)

(*) Notice: Subject to any disclaimer, the term of this patent is extended or adjusted under 35 U.S.C. 154(b) by 345 days.

(21) Appl. No.: 15/957,393

(22) Filed: Apr. 19, 2018

(65) Prior Publication Data
US 2018/0236627 A1 Aug. 23, 2018

Related U.S. Application Data

(63) Continuation of application No. PCT/IB2016/055540, filed on Sep. 16, 2016.

(30) Foreign Application Priority Data

Sep. 16, 2015 (CN) .......................... 2015 1 0589430

(51) Int. Cl.
*B24B 37/025* (2012.01)
*B24B 19/22* (2006.01)
(Continued)

(52) U.S. Cl.
CPC .............. *B24B 19/226* (2013.01); *B08B 3/02* (2013.01); *B08B 3/12* (2013.01); *B24B 19/22* (2013.01);
(Continued)

(58) Field of Classification Search
CPC ......... B24B 7/16; B24B 19/22; B24B 19/226; B24B 27/0023; B24B 37/025;
(Continued)

(56) References Cited

U.S. PATENT DOCUMENTS 5,503,590 A * 4/1996 Saitoh ................... B24B 19/226
451/10
6,390,887 B1 * 5/2002 Ulloa ....................... B23Q 7/04
451/42

(Continued)

FOREIGN PATENT DOCUMENTS

JP 2004141778 A 5/2004
WO 2004056532 A1 7/2004

OTHER PUBLICATIONS

PCT Notification of Transmittal of the International Search Report and The Written Opinion of the International Searching Authority, or the Declaration, International Search Report and Written Opinion of the International Searching Authority, dated Nov. 11, 2016, 12 pages.

(Continued)

*Primary Examiner* — Eileen P Morgan
(74) *Attorney, Agent, or Firm* — Barley Snyder

(57) ABSTRACT

An integrated equipment for processing a plurality of fiber optic ferrules comprises a polishing system, a ferrule cleaning system, a drying system, a wiping system, and a robot system. The polishing system polishes a plurality of front end faces of the plurality of fiber optic ferrules mounted on a carrier. The ferrule cleaning system cleans the carrier and
(Continued)

the fiber optic ferrules on the carrier after the fiber optic ferrules have been polished. The drying system dries the carrier and the fiber optic ferrules on the carrier after the carrier and the fiber optic ferrules have been cleaned. The wiping system wipes the front end faces of the fiber optic ferrules on the carrier after the carrier and the fiber optic ferrules have been dried. The robot system transfers the carrier to the polishing system, the ferrule cleaning system, the drying system, and the wiping system.

23 Claims, 3 Drawing Sheets

(51) Int. Cl.
| | |
|---|---|
| *B24B 55/02* | (2006.01) |
| *B08B 3/02* | (2006.01) |
| *B24B 37/34* | (2012.01) |
| *B24B 27/00* | (2006.01) |
| *B24B 41/00* | (2006.01) |
| *B24B 49/00* | (2012.01) |
| *G02B 6/38* | (2006.01) |
| *B24B 37/02* | (2012.01) |
| *B08B 3/12* | (2006.01) |
| *B08B 1/04* | (2006.01) |

(52) U.S. Cl.
CPC ...... *B24B 27/0023* (2013.01); *B24B 27/0038* (2013.01); *B24B 37/02* (2013.01); *B24B 37/025* (2013.01); *B24B 41/005* (2013.01); *B24B 49/00* (2013.01); *B24B 55/02* (2013.01); *G02B 6/3866* (2013.01); *B08B 1/04* (2013.01); *B08B 2240/02* (2013.01)

(58) Field of Classification Search
CPC ..... B24B 37/345; B24B 41/005; B24B 49/00; B24B 55/02; B08B 3/02; B08B 3/12; B08B 2240/02; G02B 6/3866
USPC ...................................................... 451/41, 67
See application file for complete search history.

(56) References Cited

U.S. PATENT DOCUMENTS

| | | | | |
|---|---|---|---|---|
| 7,209,629 | B2* | 4/2007 | Bianchi | G02B 6/381 |
| | | | | 385/134 |
| 8,128,459 | B2* | 3/2012 | Ling | B24B 19/226 |
| | | | | 451/11 |
| 2004/0237331 | A1* | 12/2004 | Sarfaty | G02B 6/25 |
| | | | | 34/218 |
| 2005/0276558 | A1* | 12/2005 | Bianchi | G02B 6/381 |
| | | | | 385/134 |
| 2006/0035562 | A1* | 2/2006 | Sarfati | B24B 19/226 |
| | | | | 451/5 |
| 2007/0232203 | A1* | 10/2007 | Fukuda | B08B 1/04 |
| | | | | 451/287 |
| 2018/0257111 | A1* | 9/2018 | Xin | B08B 1/008 |
| 2018/0257112 | A1* | 9/2018 | Xin | B08B 3/02 |
| 2018/0257114 | A1* | 9/2018 | Xin | B08B 3/12 |
| 2018/0267254 | A1* | 9/2018 | Xin | G02B 6/3866 |

OTHER PUBLICATIONS

Abstract of JP2004141778, dated May 20, 2004, 1 page.

* cited by examiner

INTEGRATED EQUIPMENT FOR PROCESSING FIBER OPTIC FERRULE

CROSS-REFERENCE TO RELATED APPLICATIONS

This application is a continuation of PCT International Application No. PCT/IB2016/055540, filed on Sep. 16, 2016, which claims priority under 35 U.S.C. § 119 to Chinese Patent Application No. 201510589430.6, filed on Sep. 16, 2015.

FIELD OF THE INVENTION

The present invention relates to an integrated equipment and, more particularly, to an integrated equipment for processing a fiber optic ferrule.

BACKGROUND

A fiber optic connector generally comprises a housing and a fiber optic ferrule mounted in the housing. The fiber optic ferrule has a ferrule and an optical fiber inserted into a bore of the ferrule. A front end of the optical fiber protrudes from a front end face of the ferrule by a predetermined distance. The optical fiber is fixed in the bore of the ferrule by an adhesive filled in the bore of the ferrule.

After the optical fiber is fixed in the bore of the ferrule, the front end face of the fiber optic ferrule is processed. The processing of the front end face of the fiber optic ferrule generally includes polishing the front end face of the fiber optic ferrule, cleaning the polished fiber optic ferrule to remove the polishing powder from the fiber optic ferrule, drying the cleaned fiber optic ferrule, and wiping the front end face of the dried fiber optic ferrule to remove dust from the front end face of the fiber optic ferrule. The processing of the fiber optic ferrule is generally performed manually and is therefore inefficient. Furthermore, the fiber optic ferrule is easily damaged during manual processing.

SUMMARY

An integrated equipment for processing a plurality of fiber optic ferrules comprises a polishing system, a ferrule cleaning system, a drying system, a wiping system, and a robot system. The polishing system polishes a plurality of front end faces of the plurality of fiber optic ferrules mounted on a carrier. The ferrule cleaning system cleans the carrier and the fiber optic ferrules on the carrier after the fiber optic ferrules have been polished. The drying system dries the carrier and the fiber optic ferrules on the carrier after the carrier and the fiber optic ferrules have been cleaned. The wiping system wipes the front end faces of the fiber optic ferrules on the carrier after the carrier and the fiber optic ferrules have been dried. The robot system transfers the carrier to the polishing system, the ferrule cleaning system, the drying system, and the wiping system.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
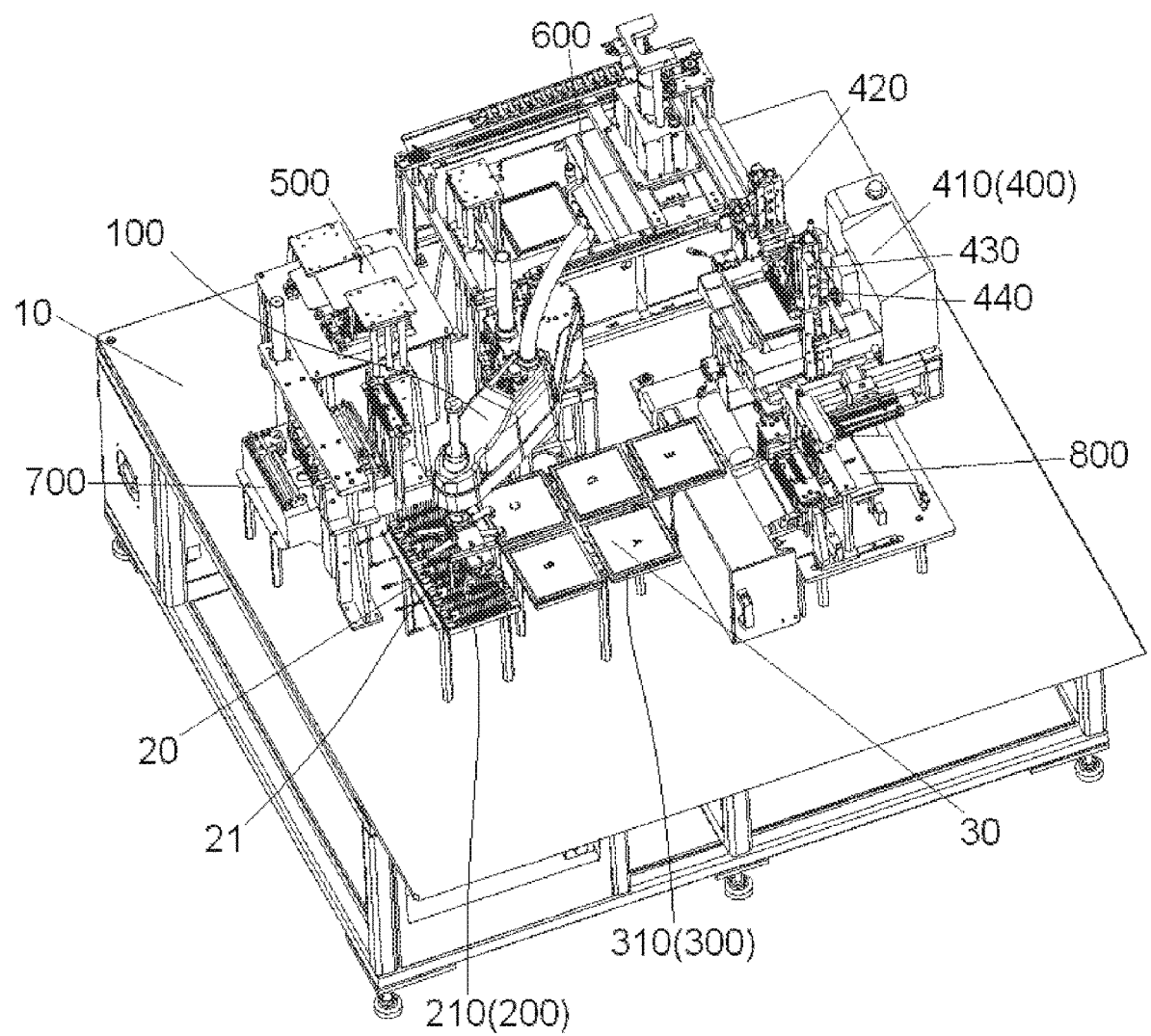
FIG. 1 is a perspective view of an integrated equipment according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

An integrated equipment according to an embodiment is shown in FIG. 1. The integrated equipment includes a polishing system 400, a ferrule cleaning system 500, a drying system 700, a wiping system 800, and a robot system 100.

The polishing system 400 is configured to polish front end faces of a plurality of fiber optic ferrules 21 mounted on a carrier 20 shown in FIG. 1. The carrier 20 is mounted with the plurality of fiber optic ferrules 21. The integrated equipment processes the plurality of fiber optic ferrules 21 on the carrier 20 in a batch, increasing the processing efficiency.

The ferrule cleaning system 500 is configured to clean the carrier 20 and the polished fiber optic ferrules 21 on the carrier 20. The drying system 700 is configured to dry the cleaned carrier 20 and the cleaned fiber optic ferrules 21 on the carrier 20. The wiping system 800 is configured to wipe the front end faces of the dried fiber optic ferrules 21 on the carrier 20. The robot system 100 is configured to transfer the carrier 20 to the polishing system 400, the ferrule cleaning system 500, the drying system 700, and the wiping system 800.

The integrated equipment, as shown in FIG. 1, further comprises a carrier loading system 200 adapted to load and store a plurality of carriers 20. The carrier loading system 200 comprises a carrier support table 210 on which the carriers 20 are adapted to be loaded and stored. The robot system 100 is adapted to pick up the carrier 20 from the carrier loading system 200 and transfer the picked carrier 20 to the polishing system 400.

The integrated equipment, as shown in FIG. 1, further comprises a polishing film loading system 300 adapted to load and store a plurality of polishing films 30. The robot system 100 is adapted to pick up the polishing film 30 from the polishing film loading system 300 and transfer the picked polishing film 30 to the polishing system 400.

The integrated equipment, as shown in FIG. 1, further comprises a polishing film cleaning system 600 adapted to clean the used polishing film 30. The robot system 100 is adapted to transfer the used polishing film 30 from the polishing system 400 to the polishing film cleaning system 600.

As shown in FIG. 1, the carrier loading system 200, the polishing film loading system 300, the polishing system 400, the ferrule cleaning system 500, the polishing film cleaning system 600, the drying system 700, and the wiping system 800 are arranged in a circle around the robot system 100. This orientation greatly reduce the moving distance of the robot system 100 during transferring the carrier 20 or the polishing film 30, further improving the processing efficiency of the fiber optic ferrules 21.

As shown in FIG. 1, in a counterclockwise direction, the carrier loading system 200 is located near the polishing film loading system 300, the polishing film loading system 300 is located near the wiping system 800, the wiping system 800 is located near the polishing system 400, the polishing system 400 is located near the polishing film cleaning system 400, the polishing film cleaning system 600 is located near the ferrule cleaning system 500, the ferrule cleaning system 500 is located near the drying system 700, and the drying system 700 is located near the carrier loading system 200. By arranging the above systems in the specific respective positions along the circle, the working process of the integrated equipment is optimized, further improving the processing efficiency of the fiber optic ferrules 21.

As shown in FIG. 1, the robot system 100, the carrier loading system 200, the polishing film loading system 300, the polishing system 400, the ferrule cleaning system 500, the polishing film cleaning system 600, the drying system 700, and the wiping system 800 are mounted on a common support base 10.

The polishing system 400, as shown in FIG. 1, comprises a polishing film installation plate, a carrier holder 430, and a driving mechanism 410. The polishing films 30 are installed on the polishing film installation plate. The carrier holder 430 is adapted to hold the carriers 20 and press the carriers 20 on the polishing films 30. The driving mechanism 410 is adapted to drive the polishing film installation plate to move fore and aft relative to the carrier holder 430. The polishing films 30 installed on the polishing film installation plate move fore and aft with the polishing film installation plate, so as to polish the front end faces of the fiber optic ferrules 21 mounted on the carrier 20.

The polishing system 400 further comprises a position sensor 420 shown in FIG. 1 adapted to detect the positions of the polishing film installation plate and the polishing film 30. The robot system 100 is adapted to pick up and place the polishing film 30 under the guide of the position sensor 420. The polishing system 400 further comprises a liquid spray head 440 shown in FIG. 1 adapted to spray a working fluid to the polishing films 30 during polishing the front end faces of the fiber optic ferrules 21, so as to cool and lubricate the polishing films 30 and the fiber optic ferrules 21. The polishing system 400 further comprises a gas spray head adapted to spray a gas to the polishing films 30 after polishing the front end faces of the fiber optic ferrules 21, so as to dry the polishing films 30.

Figure 2:
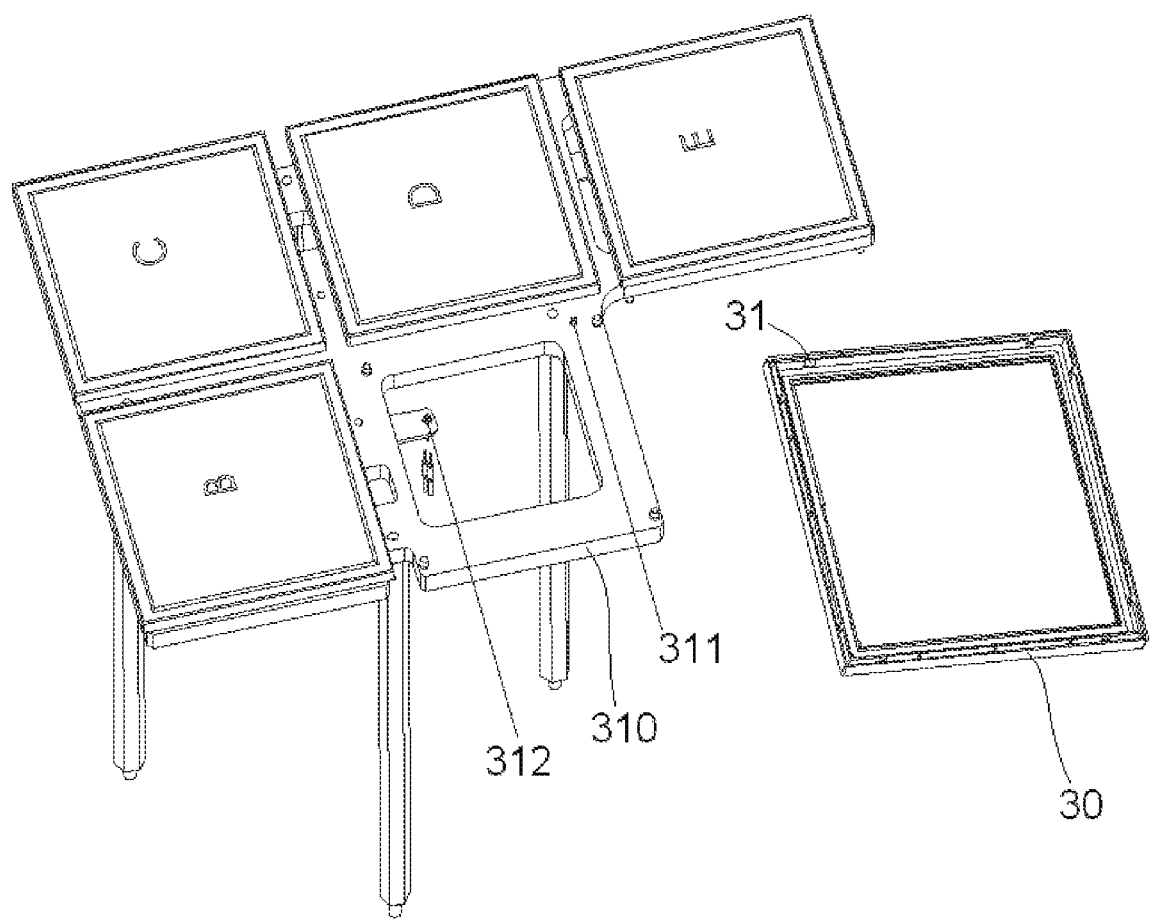
FIG. 2 is a perspective view of a polishing film loading system of the integrated equipment.

The polishing film loading system 300, as shown in FIGS. 1 and 2, comprises a polishing film installation table 310 on which the polishing films 30 are loaded and stored. The polishing film installation table 310 is adapted to load and store different types of polishing films 30. The polishing film installation table 310 comprises a plurality of polishing film installation regions A, B, C, D, E each corresponding to a different type of polishing film 30. A slot 31 is formed in each type of polishing film 30, a pin 311 to be fitted in the slot 31 is provided on each of the polishing film installation regions A, B, C, D, E. The pin 311 on one of the polishing film installation regions A, B, C, D, E is configured to mate with only the slot 31 of the type of polishing film 30 corresponding to the one region, so that the type of polishing film 30 is not capable of being installed on the polishing film installation region not corresponding the type of polishing film 30. That is, the type of polishing film 30 is only capable of being installed on the one region corresponding the type of polishing film 30.

A sensor 312, as shown in FIG. 2, is provided under each of the polishing film installation regions A, B, C, D, E and is configured to detect whether the polishing film 30 is installed on the polishing film installation region in position.

Figure 3:
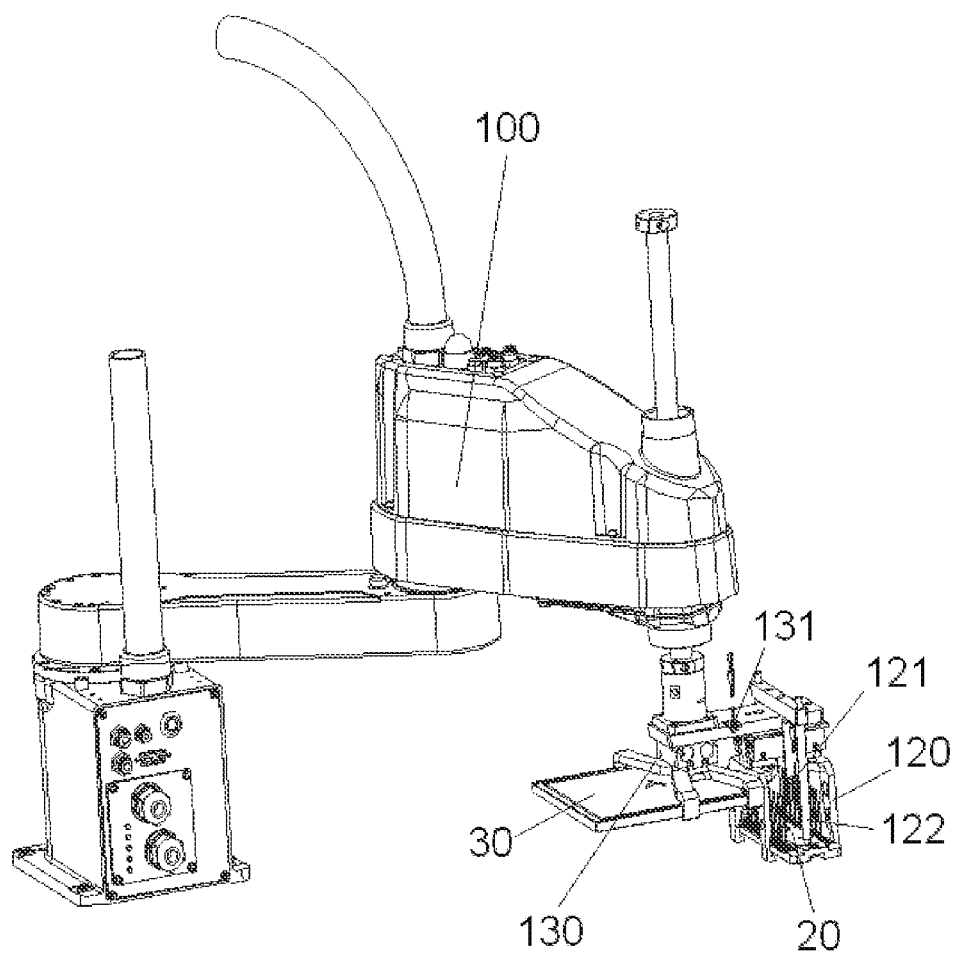
FIG. 3 is a perspective view of a robot system of the integrated equipment.

The robot system 100, as shown in FIG. 3, comprises a multi-freedom robot, a carrier gripper 120 mounted on the robot and adapted to grip the carrier 20, and a polishing film gripper 130 mounted on the robot and adapted to grip the polishing film 30. The robot system 100 further comprises a carrier sensor 121 adapted to detect whether the carrier gripper 120 grips the carrier 20 and a polishing film sensor 131 adapted to detect whether the polishing film gripper 130 grips the polishing film 30. The carrier gripper 120, as shown in FIG. 3, has a positioning pin 122 adapted to be inserted into a positioning hole formed in the carrier 20, so as to prevent the carrier 20 from being moved.

The ferrule cleaning system 500 comprises a ferrule cleaning box in which a cleaning liquid for cleaning the fiber optic ferrules 21 is contained, a carrier moving and holding device adapted to move the carrier 20 into the ferrule cleaning box and hold the carrier 20 in the ferrule cleaning box, and an ultrasonic generator mounted in the ferrule cleaning box and adapted to emit an ultrasonic wave into the cleaning liquid. The ferrule cleaning system 500 cleans the carrier 20 and the fiber optic ferrules 21 on the carrier 20 immersed in the cleaning liquid contained in the ferrule cleaning box.

The polishing film cleaning system 600 comprises a polishing film cleaning box, a polishing film moving and holding unit adapted to move the polishing films 30 into the polishing film cleaning box and hold the polishing films 30 in the polishing film cleaning box, a cleaning liquid spray head adapted to spray a cleaning liquid to the polishing films 30 held in the polishing film cleaning box, and a rolling brush unit adapted to brush the polishing films 30 while spraying the cleaning liquid to the polishing films 30.

The drying system 700 comprises a drying box, a carrier moving and holding unit adapted to move the carrier 20 into the drying box and hold the carrier 20 in the drying box, and a high pressure jet device mounted on the drying box and adapted to spray a high pressure gas to the carrier 20 held in the drying box. The drying system 700 dries the carrier 20 and the fiber optic ferrules 21 on the carrier 20.

The wiping system 800 comprises a support table, a wiping belt conveying unit adapted to convey a wiping belt onto the support table, a carrier holding device adapted to hold the carrier 20, a carrier pressing device adapted to press the carrier 20 on the support table, so that the front end faces of the fiber optic ferrules 21 on the carrier 20 are in direct contact with the wiping belt on the support table, and an installation base on which the support table is fixed. The carrier holding device and the carrier pressing device are slidably mounted on the installation base, so that the carrier 20 pressed on the support table is movable fore and aft relative to the support table, so as to wipe the front end faces of the fiber optic ferrules 21 on the carrier 20 with the wiping belt.

The processing of the fiber optic ferrules 21 using the integrated equipment will now be described in greater detail with reference to FIGS. 1-3.

First, the robot system 100 picks up the polishing film 30 from the polishing film loading system 300 and transfers the picked polishing film 30 to the polishing system 400.

Then, the robot system 100 picks up the carrier 20 from the carrier loading system 200 and transfer the picked carrier 20 to the polishing system 400.

Then, the polishing system 400 polished the front end faces of the fiber optic ferrules 21 mounted on the carrier 20 using the polishing films 30.

Then, the robot system 100 transfers the carrier 20 from the polishing system 400 to the ferrule cleaning system 500 after the front end faces of the fiber optic ferrules 21 mounted on the carrier 20 have been polished.

Then, the ferrule cleaning system 500 cleans the carrier 20 and the fiber optic ferrules 21 mounted on the carrier 20, so as to clean off the polishing powder from the carrier 20 and the fiber optic ferrules 21.

Then, the robot system 100 transfers the carrier 20 from the ferrule cleaning system 500 to the drying system 700.

Then, the drying system 700 dries the carrier 20 and the fiber optic ferrules 21 mounted on the carrier 20.

Then, the robot system 100 transfers the carrier 20 from the drying system 700 to the wiping system 800.

Lastly, the wiping system 800 wipes the front end faces of the fiber optic ferrules 21 mounted on the carrier 20, so as to wipe off the dust from the front end faces of the fiber optic ferrules 21.

If the polishing films 30 used in the polishing system 400 have become very dirty and cannot effectively polish the front end faces of the fiber optic ferrules 21, i.e. if too much polishing powder is attached thereon, the dirty polishing films 30 are replaced with unused clean polishing films 30. The used dirty polishing films 30 are cleaned. In this embodiment, the above processing of the fiber optic ferrules 21 further comprises the steps of:

transferring the used dirty polishing films 30 from the polishing system 400 to the polishing film cleaning system 600 using the robot system 100, so as to clean the used dirty polishing films 30; and transferring the cleaned polishing films 30 from the polishing film cleaning system 600 to the polishing system 400 or the polishing film loading system 300 using the robot system 100.

What is claimed is:

1. An integrated equipment for processing a plurality of fiber optic ferrules, comprising:
   a polishing system configured to polish a plurality of front end faces of a plurality of fiber optic ferrules mounted on a carrier with a polishing film;
   a ferrule cleaning system configured to clean the carrier and the fiber optic ferrules on the carrier after the fiber optic ferrules have been polished;
   a drying system configured to dry the carrier and the fiber optic ferrules on the carrier after the carrier and the fiber optic ferrules have been cleaned;
   a wiping system configured to wipe the front end faces of the fiber optic ferrules on the carrier after the carrier and the fiber optic ferrules have been dried;
   a robot system configured to transfer the carrier to the polishing system, the ferrule cleaning system, the drying system, and the wiping system; and
   a polishing film cleaning system adapted to clean the polishing film after the polishing film has been used, the robot system adapted to transfer the polishing film that has been used from the polishing system to the polishing film cleaning system.

2. The integrated equipment of claim 1, further comprising a carrier loading system adapted to load and store a plurality of carriers, the robot system adapted to pick up the carrier from the carrier loading system and transfer the carrier to the polishing system.

3. The integrated equipment of claim 2, wherein the carrier loading system comprises a carrier support table on which the carriers are loaded and stored.

4. The integrated equipment of claim 2, further comprising a polishing film loading system adapted to load and store a plurality of polishing films, the robot system adapted to pick up one of the plurality of polishing films from the polishing film loading system and transfer the polishing film to the polishing system.

5. The integrated equipment of claim 4, wherein the carrier loading system, the polishing film loading system, the polishing system, the ferrule cleaning system, the polishing film cleaning system, the drying system, and the wiping system are arranged around the robot system.

6. The integrated equipment of claim 5, wherein the carrier loading system is positioned near the polishing film loading system, the polishing film loading system is positioned near the wiping system, the wiping system is positioned near the polishing system, the polishing system is positioned near the polishing film cleaning system, the polishing film cleaning system is positioned near the ferrule cleaning system, the ferrule cleaning system is positioned near the drying system, and the drying system is positioned near the carrier loading system.

7. The integrated equipment of claim 6, wherein the robot system, the carrier loading system, the polishing film loading system, the polishing system, the ferrule cleaning system, the polishing film cleaning system, the drying system, and the wiping system are mounted on a common support base.

8. The integrated equipment of claim 4, wherein the polishing film loading system comprises a polishing film installation table on which the polishing films are loaded and stored.

9. The integrated equipment of claim 8, wherein the polishing film installation table is adapted to load and store a plurality of different types of polishing films.

10. The integrated equipment of claim 9, wherein the polishing film installation table has a plurality of polishing film installation regions each corresponding to one of the plurality of different types of polishing films, a slot is formed in each type of polishing film and a pin is provided on each of the polishing film installation regions, the pin on each of the polishing film installation regions is configured to mate with only the slot of the type of polishing film corresponding to the region.

11. The integrated equipment of claim 10, wherein the polishing film installation table has a sensor disposed under each of the polishing film installation regions and configured to detect whether the polishing film is installed on the polishing film installation region.

12. The integrated equipment of claim 1, wherein the ferrule cleaning system comprises:
   a ferrule cleaning box in which a cleaning liquid is contained;
   a carrier moving and holding device adapted to move the carrier into the ferrule cleaning box and hold the carrier in the ferrule cleaning box; and
   an ultrasonic generator mounted in the ferrule cleaning box and adapted to emit an ultrasonic wave into the cleaning liquid to clean the carrier and the fiber optic ferrules on the carrier immersed in the cleaning liquid of the ferrule cleaning box.

13. The integrated equipment of claim 1, wherein the polishing film cleaning system comprises:
   a polishing film cleaning box;
   a polishing film moving and holding unit adapted to move the polishing films into the polishing film cleaning box and hold the polishing films in the polishing film cleaning box;
   a cleaning liquid spray head adapted to spray a cleaning liquid to the polishing films held in the polishing film cleaning box; and a rolling brush unit adapted to brush the polishing films while spraying the cleaning liquid to the polishing films.

14. The integrated equipment of claim 1, wherein the drying system comprises:
   a drying box;
   a carrier moving and holding unit adapted to move the carrier into the drying box and hold the carrier in the drying box; and
   a high pressure jet device mounted on the drying box and adapted to spray a high pressure gas to the carrier held in the drying box to dry the carrier and the fiber optic ferrules on the carrier.

15. The integrated equipment of claim 1, wherein the wiping system comprises:
   a support table;
   a wiping belt conveying unit adapted to convey a wiping belt onto the support table;
   a carrier holding device adapted to hold the carrier;
   a carrier pressing device adapted to press the carrier on the support table, so that the front end faces of the fiber optic ferrules on the carrier directly contact the wiping belt on the support table; and
   an installation base on which the support table is fixed, the carrier holding device and the carrier pressing device are slidably mounted on the installation base so that the carrier pressed on the support table is movable fore and aft relative to the support table to wipe the front end faces of the fiber optic ferrules on the carrier with the wiping belt.

16. An integrated equipment for processing a plurality of fiber optic ferrules, comprising:
   a polishing system configured to polish a plurality of front end faces of a plurality of fiber optic ferrules mounted on a carrier with a polishing film, the polishing system comprises:
      a polishing film installation plate on which one of a plurality of polishing films are installed;
      a carrier holder adapted to hold the carriers and press the carriers on the polishing film; and
      a driving mechanism adapted to drive the polishing film installation plate to move fore and aft relative to the carrier holder, the polishing film installed on the polishing film installation plate is arranged to move fore and aft with the polishing film installation plate to polish the front end faces of the fiber optic ferrules mounted on the carrier;
   a ferrule cleaning system configured to clean the carrier and the fiber optic ferrules on the carrier after the fiber optic ferrules have been polished;
   a drying system configured to dry the carrier and the fiber optic ferrules on the carrier after the carrier and the fiber optic ferrules have been cleaned;
   a wiping system configured to wipe the front end faces of the fiber optic ferrules on the carrier after the carrier and the fiber optic ferrules have been dried;
   a robot system configured to transfer the carrier to the polishing system, the ferrule cleaning system, the drying system, and the wiping system; and
   a polishing film loading system adapted to load and store the plurality of polishing films, the robot system adapted to pick up one of the plurality of polishing films from the polishing film loading system and transfer the polishing film to the polishing system.

17. The integrated equipment of claim 16, further comprising a polishing film cleaning system adapted to clean the polishing film after the polishing film has been used, the robot system adapted to transfer the polishing film that has been used from the polishing system to the polishing film cleaning system.

18. The integrated equipment of claim 16, wherein the polishing system comprises a position sensor adapted to detect a position of the polishing film installation plate and a position of the polishing film, the robot system is adapted to pick up and place the polishing film under the guide of the position sensor.

19. The integrated equipment of claim 18, wherein the polishing system comprises a liquid spray head adapted to spray a working fluid to the polishing films during polishing the front end faces of the fiber optic ferrules to cool and lubricate the polishing films and the fiber optic ferrules.

20. The integrated equipment of claim 19, wherein the polishing system comprises a gas spray head adapted to spray a gas to the polishing films after polishing the front end faces of the fiber optic ferrules to dry the polishing films.

21. An integrated equipment for processing a plurality of fiber optic ferrules, comprising:
   a polishing system configured to polish a plurality of front end faces of a plurality of fiber optic ferrules mounted on a carrier with a polishing film;
   a ferrule cleaning system configured to clean the carrier and the fiber optic ferrules on the carrier after the fiber optic ferrules have been polished;
   a drying system configured to dry the carrier and the fiber optic ferrules on the carrier after the carrier and the fiber optic ferrules have been cleaned;
   a wiping system configured to wipe the front end faces of the fiber optic ferrules on the carrier after the carrier and the fiber optic ferrules have been dried;
   a robot system configured to transfer the carrier to the polishing system, the ferrule cleaning system, the drying system, and the wiping system, the robot system comprises:
      a multi-freedom robot;
      a carrier gripper mounted on the robot and adapted to grip the carrier; and
      a polishing film gripper mounted on the robot and adapted to grip the polishing film; and
   a polishing film loading system adapted to load and store a plurality of polishing films, the robot system adapted to pick up one of the plurality of polishing films from the polishing film loading system and transfer the polishing film to the polishing system.

22. The integrated equipment of claim 21, wherein the robot system comprises a carrier sensor adapted to detect whether the carrier gripper grips the carrier and a polishing film sensor adapted to detect whether the polishing film gripper grips the polishing film.

23. The integrated equipment of claim 22, wherein the carrier gripper has a positioned pin adapted to be inserted into a position hole formed in the carrier to prevent the carrier from being moved.

* * * * *